United States Patent [19]

Frame

[11] 4,238,980
[45] Dec. 16, 1980

[54] TIRE STRIPPING APPARATUS

[76] Inventor: Floyd L. Frame, 3035 E Chinden Blvd., Meridian, Id. 83642

[21] Appl. No.: 30,130

[22] Filed: Apr. 16, 1979

[51] Int. Cl.³ .............................. B23B 3/06; B23B 3/04
[52] U.S. Cl. ............................................ 82/54; 82/58; 82/59; 82/82
[58] Field of Search .................... 82/54, 57, 58, 59, 60, 82/61, 62, 70.2, 72, 78, 82, 83, 84, 86, 87, 89, 91, 100

[56] References Cited

U.S. PATENT DOCUMENTS

| | | | |
|---|---|---|---|
| 1,190,192 | 7/1916 | Reichel | 82/57 |
| 1,372,040 | 3/1921 | Rendano | 82/58 |
| 2,367,243 | 1/1945 | Sweeny | 82/100 |
| 2,641,944 | 6/1953 | Laffoon | 82/59 |
| 3,701,296 | 10/1972 | Snow | 82/54 |
| 4,012,973 | 3/1977 | Tupper | 82/82 |
| 4,096,772 | 6/1978 | Hall et al. | 82/82 |

*Primary Examiner*—Harrison L. Hinson
*Attorney, Agent, or Firm*—Paul F. Horton

[57] ABSTRACT

Apparatus for stripping worn-out tires into useful fencing material. The apparatus includes a housing upon which is mounted a vertically and rotatably mounted cutting disc; a tire feeding cylinder operable to force a tire section into the cutting disc for cutting a continuous longitudinal strip of tire of selected width; a guide for controlling strip width; a cutter control for moving the cutting disc relative to the feed cylinder; and a drive unit operable to rotate the cutting disc and tire feeding cylinder. The apparatus may also include a tire support for holding the tire in a horizontal plane while removing a tire bead.

4 Claims, 5 Drawing Figures

TIRE STRIPPING APPARATUS

BACKGROUND OF THE INVENTION

1. Field of the Invention

This invention relates to apparatus for stripping tire carcasses for producing fencing material.

2. Description of the Prior Art

The economical disposal of worn-out tires has long been recognized as a problem. Worn-out carcasses have been used as toys, flower beds, bumper guards, and in many other imaginative ways. Such use however, is severely limited and inventory continues to grow. Burning of the carcasses raise environmental problems. Prior art apparatus, as typified by that disclosed in U.S. Pat. No. 3,803,693 issued to Kolkhic and U.S. Pat. No. 3,885,292 issued to Sharp, is largely used for tire mutilation or dismounting.

SUMMARY OF THE INVENTION

The present invention provides a method and apparatus for cutting a tire carcass into a single continuous longitudinal strip for use as fencing. A thorough description of the invention may be found in the appended claims.

It is therefore a general object of the present invention to provide a method of converting worn-out tires to useful fencing materials; to provide apparatus for accomplishing the task; and to provide a useful fencing product.

More specifically, it is an object of the present invention to provide apparatus which will remove tire beads and which is operable to cut a tire carcass into strong, durable, and injury preventive fencing for livestock.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
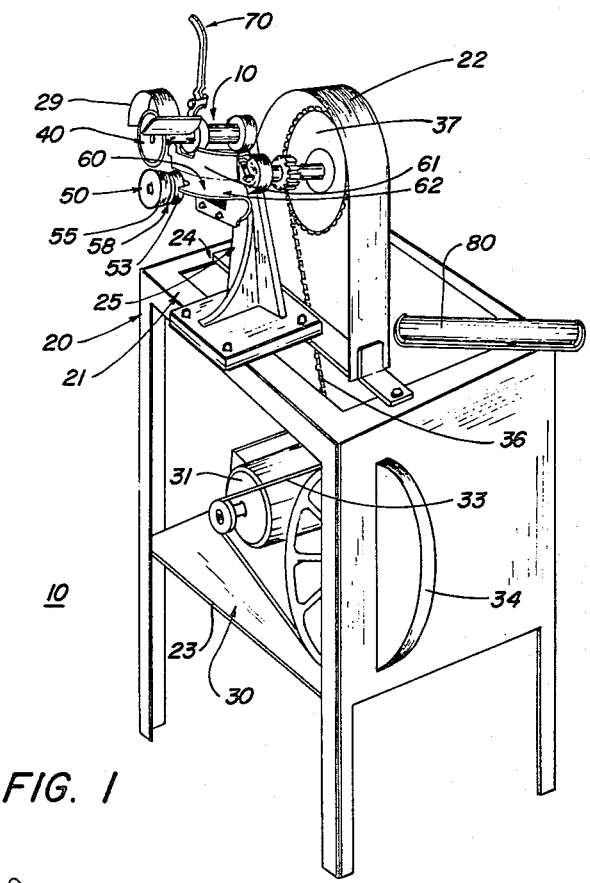
FIG. 1 is a perspective view of one preferred embodiment of the apparatus of the present invention.
Figure 2:
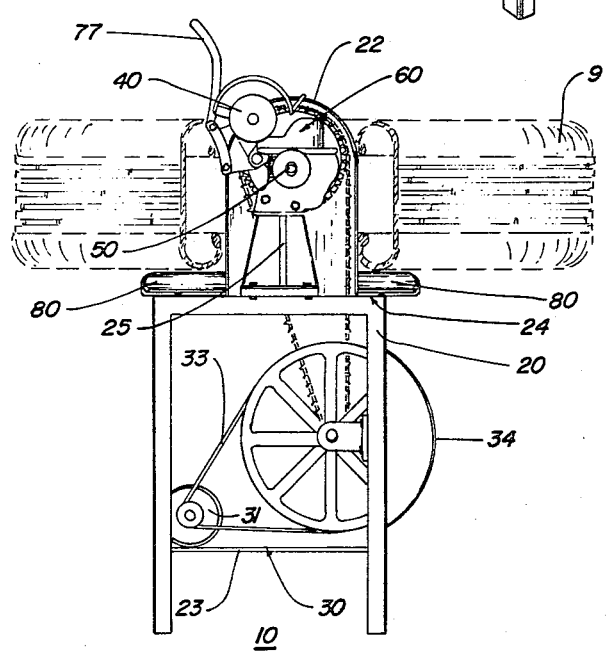
FIG. 2 is a front elevation of the apparatus showing a tire in position for removal of the bead.

Referring now to the drawings, an embodiment to be preferred of tire stripping apparatus 10, made according to the present invention is disclosed. Apparatus 10 includes a housing 20; drive means 30; cutting means 40; feed means 50; guide 60; cutter control 70; and tire support means 80.

Housing 20 includes a support stand 21 having four leg supports carrying a lower platform 23 and an upper platform 24. Vertically mounted on upper platform 24 is a support arm 25, substantially L-shaped in configuration permitting a tire to be placed in the hollow of the L, as will later be explained. A protective cover 22 covering gear members and a protective shield 29 may also be provided.

Figure 4:
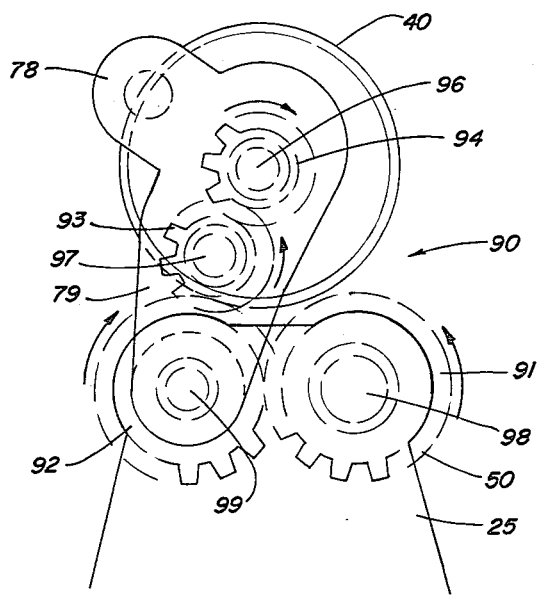
FIG. 4 is a sectional front view of the gear arrangement of the apparatus of the present invention.

Lower platform 23 carries on its uppermost surface conventional drive motor 31, which, by means of belt 33, rotates a reduction wheel 34 which is rotatably mounted to housing 20 in conventional manner. Reduction wheel 34 is provided with an axially concentrically secured sprocket wheel 35, of substantially smaller diameter than the reduction wheel. Wheel 35 is connected to a second sprocket wheel 37 by means of an endless chain 36 for rotation. Wheel 37, in turn, drives gear 91 of gear system 90, shown to advantage in FIG. 4. Wheel 37 and gear 91 are coaxially secured to shaft 98 which is journaled for rotation in support arm 25. Gear 91 meshes with and drives a second gear 92 rotatably mounted on shaft 99 which is secured to arm 25.

Cutter control means 70 includes a pivot arm 79 which pivotally engages shaft 99. Arm 79 carries a third gear 93 mounted for rotation on shaft 97 and a fourth gear 94 mounted on shaft 96, which is journaled for rotation in pivot arm 79. Gear 93 meshes with and is driven by gear 92 and, in turn, meshes with and drives gear 94. It will be noted that as pivot arm 79 is pivoted on shaft 99, gear 93 follows an arcuate path about gear 92 allowing gear 94 to approach and recede from gear 91, thereby permitting movement of cutting disc 40 toward and away from feed means 50. Arm 79 may be provided with a flange 78 for attachment of a handle 77 to provide suitable leverage for movement of the pivot arm.

Mounted to the free end of shaft 96 opposing gear 94 is a cutting disc or wheel 40. While the wheel may be provided with cutting teeth or a serrated edge, as with conventional circular saws, it is preferred that the outer edge be honed from each side to provide a cutting disc having a sharp V-shaped cutting edge.

Figure 3:
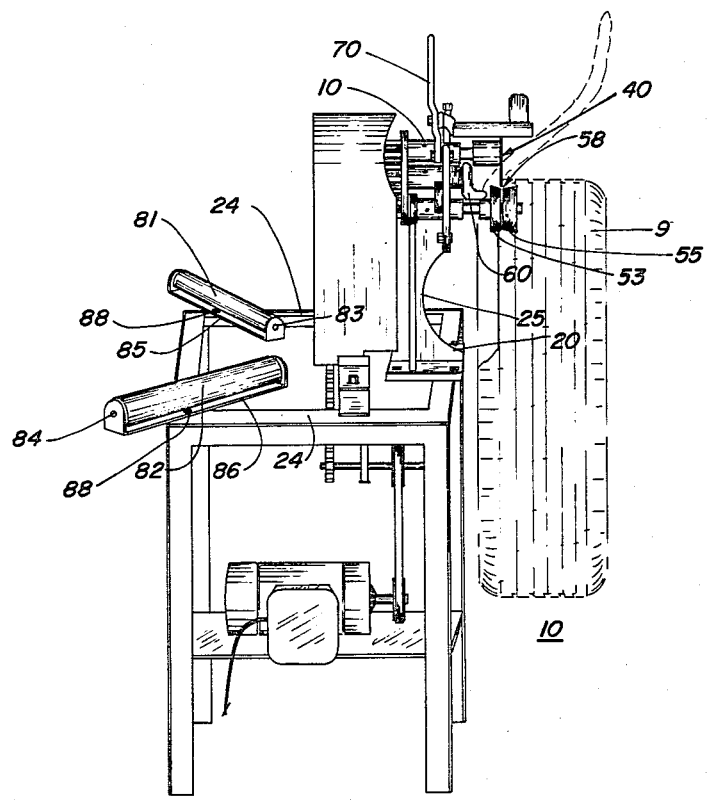
FIG. 3 is a side elevation showing a tire at one position during the stripping process.

Acting in cooperation with cutting wheel 40 is feed means 50. The feed means of the preferred embodiment and, as shown to advantage in FIGS. 1 and 3, includes an outer member 55 having a frusto-conical periphery and an inner cylindrical member 53 which is inwardly and coaxially spaced from member 55. It is critical that outer member 55 have a greater diameter than inner member 53 to force tire 9 inwardly against guide 60 to obtain tire strips of consistent width. Members 53 and 55 are secured to the terminal free end of shaft 98 opposite gear 91. The two members are laterally separated at a distance slightly greater than the width of the cutting edge of cutting wheel 40. The groove 58, thus formed, is operable to receive the cutting wheel as it is lowered into place by cutter control means 70, thereby assuring complete severance in the cutting process. It will be understood that outer member 55 and inner member 53 may be of separate construction or of integral construction, it only being necessary that a groove 58 is formed therein for the spaced reception of the cutting blade. It will also be understood that the tire feeding members might be attached to a rotatable shaft 99 rather than shaft 98, without changing the function of the apparatus.

Guide means 60 is preferably L-shaped in configuration. having a vertically upstanding portion 61 and a horizontal platform portion 62. The guide is adjustably connected adjacent feed means 50 to support arm 25 and may be moved both in vertical and horizontal directions for cutting a tire carcass of varying thickness into strips of varying thickness.

A pair of tire support rollers 81 and 82 are horizontally and pivotally mounted on the top surface of upper platform 24 of housing 20 so that the angle of convergency between the rollers may be adjusted to accomodate tires of varying diameter. Rollers 81 and 82 are cylindrical in form and are supported by means of shafts 83 and 84 respectively, which are, in turn, supported by horizontally pivotal brackets 85 and 86, respectively. The brackets may be pivotally secured to the top surface of upper platform 24 by bolts or rivets 88, or otherwise.

Figure 5:
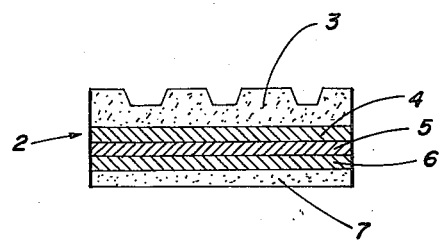
FIG. 5 is a cross section of the tire strip product useable as fencing material.

In operation, a tire carcass 9 is placed horizontally upon rollers 81 and 82 so that the center opening of the tire surrounds shield 22. With cutting wheel 40 in a retracted position from feed members 53 and 55, the top bead of the tire, normally containing steel reinforcement bands, is placed inwardly toward the vertical wall of guide 60. The apparatus is then activated by means of a switch, not shown, and cutting wheel 40 is lowered into position by means of handle 77, as previously explained, so than an annular ring is cut just outwardly from the tire bead as the tire is rotated about its vertical axis on rollers 81 and 82 by feed means 50. The cutting wheel is then retracted and the bead discarded. Once the top bead has been removed, the tire portion adjacent the removed bead is then fed into feeder 50 and cutting wheel 40 at a slight angle. Frusto-concical feed member 55 forces the tire inwardly against the substantially planar front surface of vertical guide portion 61 of guide 60 and a continuous strip of fencing material is thereby produced as the tire continues to rotate and is fed into the cutter. The process continues until a second annular ring containing the remaining bead is obtained, which also may be discarded. The tire strip 2 thereby produced and shown to advantage in FIG. 5, includes an outer rubber side or tread portion 3, one or more adhesively connected cord layers, represented by the numerals 4, 5 and 6, and a second outer and thinner rubber layer 7, which formed the inner layer of the tire. The fencing material produced is resilient, contains no sharp injury producing edges, is strong, and is durable.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Tire stripping apparatus comprising:
   housing means;
   drive means mounted on said housing means;
   cutting means rotatably mounted on said housing means and drivingly connected to said drive means;
   a substantially L-shaped guide member, including a vertically planar portion and a horizontally planar portion, mounted on said housing and operable to guide a tire portion of pre-selected width into said cutting means;
   tire feed means rotatably mounted on said housing means and drivingly connected to said drive means, said feed means including two coaxial and horizontally spaced rollers including a first substantially cylindrical roller located adjacent said guide means and a second roller of substantially frusto-conical shape outwardly spaced from said first roller to define an annular shearing slot operable to receive said cutting means, said second roller operable to force a tire inwardly against the vertical portion of said guide means whereby an angular ring may be cut from a tire placed in a horizontal position and a continuous strip may be cut from a tire placed in a substantially vertical position; and
   cutter control means operable to control displacement of said cutting means relative to said feed means.

2. The apparatus as described in claim 1, further comprising tire support means horizontally disposed on said housing means below the level of said tire feed means at a distance substantially equal to the distance between one lateral wall of a tire and the bead of an opposing wall.

3. The apparatus as described in claim 2, wherein said tire support means includes at least one roller member rotatably mounted on said housing means and operable to engage the bottom wall of a horizontally disposed tire placed thereon.

4. The apparatus as described in claim 3, wherein said tire support means includes two divergent laterally spaced roller members.

* * * * *